June 1, 1965 R. BRACKETT 3,187,296
PLUG-IN TERMINAL AND TERMINAL BLOCK FOR METER SOCKET
Filed Aug. 31, 1961 2 Sheets-Sheet 1
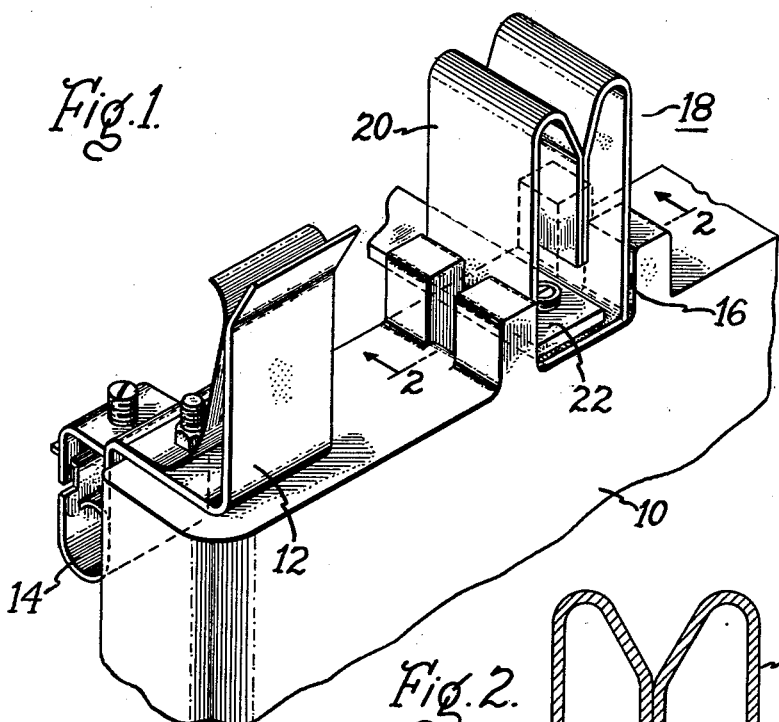
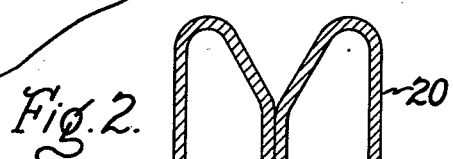
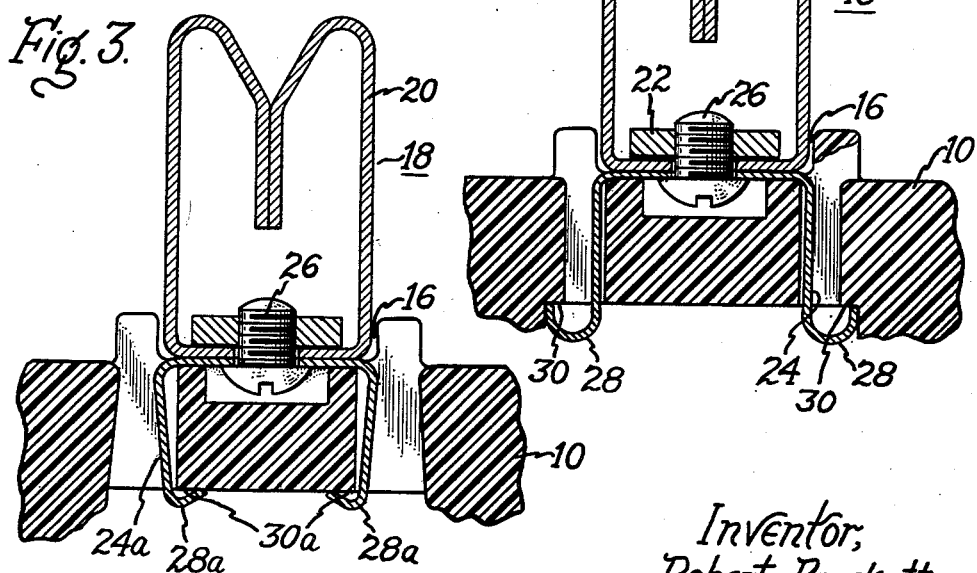
Inventor,
Robert Brackett,
by Francis K. Doyle
His Attorney.

June 1, 1965    R. BRACKETT    3,187,296
PLUG-IN TERMINAL AND TERMINAL BLOCK FOR METER SOCKET
Filed Aug. 31, 1961    2 Sheets-Sheet 2
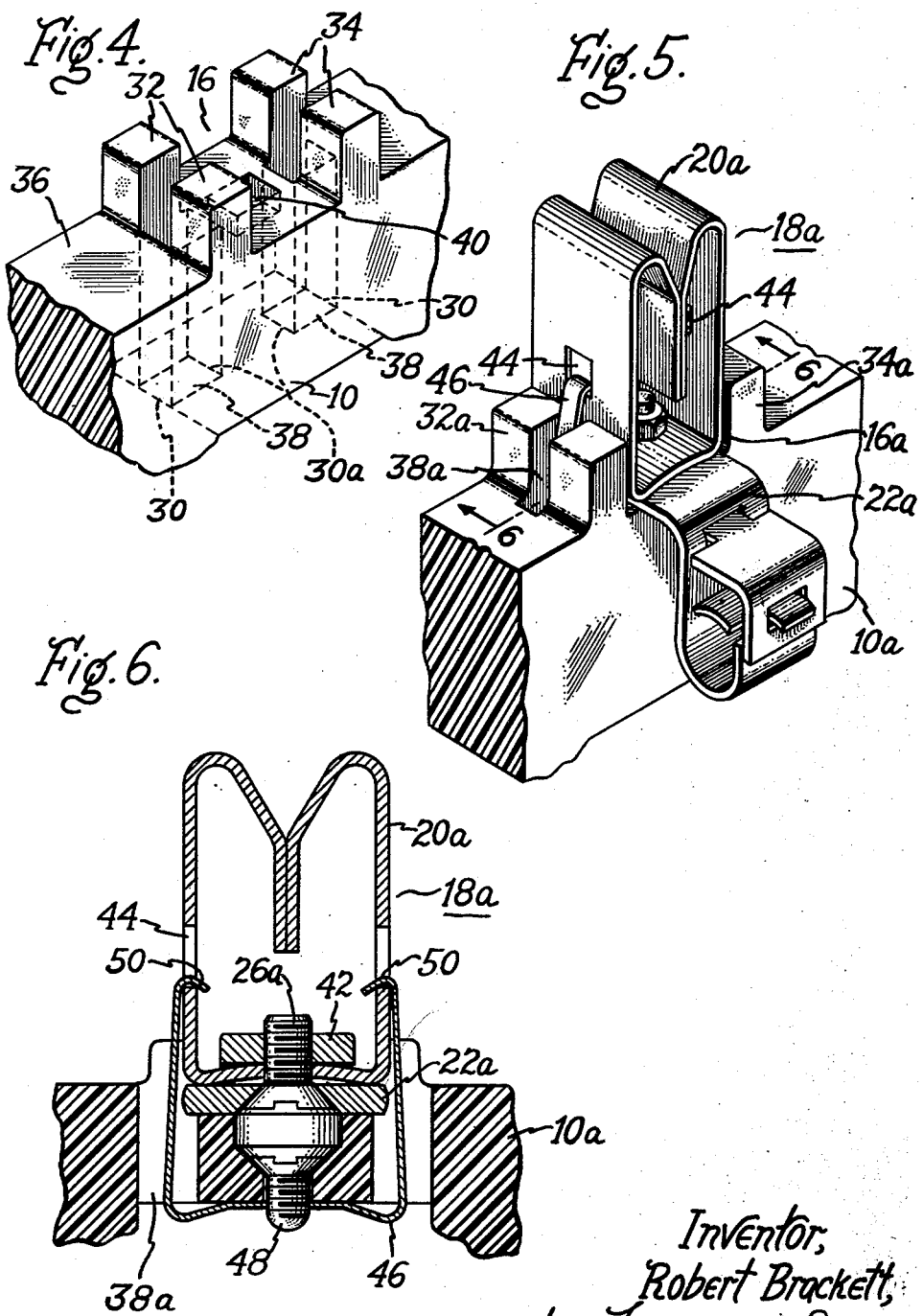

United States Patent Office 3,187,296
Patented June 1, 1965

3,187,296
PLUG-IN TERMINAL AND TERMINAL BLOCK
FOR METER SOCKET
Robert Brackett, Berwick, Maine, assignor to General
Electric Company, a corporation of New York
Filed Aug. 31, 1961, Ser. No. 135,216
5 Claims. (Cl. 339—217)

This invention relates to meter sockets and, more particularly, to a plug-in terminal for a meter socket and to a terminal block for such socket.

It is well known to those skilled in the meter art that most meter sockets are provided with four spaced terminals. These terminals are usually provided with spring jaws which provide the means for securing a device to such terminals. Meters and the like for use in such sockets are usually provided with four spaced terminals in the form of blades, such blades fitting in the spring jaws of the socket terminals to provide the desired electrical connection to the meter. However, as is well known, various types of meters are provided with either five or six terminals, depending upon the type of the meter and quantities which such meter is utilized to measure. In many instances, it is desired to change a major installation from a four-terminal meter to a five- or a six-terminal meter.

Many times, where it has been desired to change a meter installation from a four-terminal meter to a five- or six-terminal meter, it has been necessary to install a new meter socket. The new meter socket, of course, will be provided with either the five- or six-terminal jaws for mounting the meter therein. It will be clear to those skilled in this art that when it is desired to replace a meter having four terminals with a meter having five or six terminals, it is very costly and time-consuming where it is also required to install a new meter socket.

To obviate the necessity of a new meter socket, some sockets have been provided with means for mounting a fifth or sixth terminal; in these sockets a space has generally been provided in the meter socket terminal block and the fifth or sixth terminal is mounted in such space. The additional terminal may be held in place by the screws or bolts which are utilized to hold the terminal block to the meter socket. An example of this type of additional terminal can be found in Patent No. 2,695,923. It will be readily understood that in mounting the additional terminal in such manner, it is necessary to remove the screws which hold the terminal block to the socket. Clearly, where the socket is energized the removal of the screws which hold the terminal block to the socket lead to dangerous conditions to the installer or repairman, as well as providing a likelihood of property damage due to the probability of one of the energized terminals of such terminal block coming in contact with a portion of the meter socket. In other sockets, the additional terminal is mounted directly to the socket base by means of screws or bolts. It will be apparent that where necessary to use screws or bolts in mounting additional terminals, the opportunity of losing such small screws during the remodeling of the socket is great. It will also be apparent that the use of additional terminals will be costly, both in manufacture and in the installation time required to install such additional terminals in meter sockets.

From the above, it will be clear that there is a great need in the meter socket field for a meter socket in which means are provided for the rapid and inexpensive attachment of an additional socket terminal when desired. It will also be clear that there is a need for socket terminals which may be readily attached to a meter socket without the use of tools and without the expenditure of appreciable time and labor. Of course, it will also be clear that there is a great need for a means of connecting an additional terminal to a meter socket which may be done safely without endangering the installer or without danger to personal property.

It is, therefore, an object of this invention to provide a meter socket having a novel means for an attachment for an additional socket terminal thereto.

It is a further object of this invention to provide a meter socket with a socket terminal block whereby additional terminals may be readily added to such terminal block safely and inexpensively.

A still further object of this invention is to provide a plug-in terminal for use in meter sockets which may be readily attached to said socket without the need of tools.

A still further object of this invention is to provide a plug-in terminal for a meter socket which is relatively inexpensive to manufacture and which may be safely applied to a meter socket without the removal of any portions of said meter socket.

In carrying out this invention in one form a four-terminal meter socket is provided, having attaching means forming a part of the terminal block, for securing additional terminals thereto. A novel plug-in terminal is provided, comprising a terminal jaw with a wire connecting means attached thereto, and in which attaching means are provided which cooperate with the means on the terminal block for automatically securing the terminal to the terminal block when such terminal is inserted into the terminal block, without the use of any tools.

The invention which is desired to be protected will be specifically pointed out and distinctly claimed in the claims appended thereto. However, it is believed that the invention and the manner in which its objects and advantages are obtained as well as other objects and advantages thereof, will be more readily understood by reference to the following detailed description thereof, when taken in connection with the accompanying drawings in which:

FIGURE 1 is a perspective view of one form of plug-in terminal and terminal block made in accordance with this invention;

FIGURE 2 is a sectional view taken on line 2—2 of FIGURE 1, showing one form of plug-in terminal and terminal block of this invention in greater detail;

FIGURE 3 is a sectional view similar to FIGURE 2 showing a modified type of plug-in terminal;

FIGURE 4 is a perspective view of a portion of a terminal block showing one form of terminal block cooperating attaching means;

FIGURE 5 is a perspective view of another form of plug-in terminal and terminal block according to this invention;

FIGURE 6 is a sectional view taken on the line 6—6 of FIGURE 5, showing this form of the invention in greater detail.

Referring now to the drawing in which like numerals are used to indicate like parts throughout, the invention is therein shown as comprising a novel plug-in terminal for use with a meter socket. As shown in the drawings, the novel plug-in terminal comprises a terminal jaw means having a wire connecting means connected thereto and being provided with attaching means whereby the plug-in terminal may be inserted into a portion of a meter socket terminal block and automatically secured thereto with safety to the installer and without the use of tools. Also shown in the drawing, is the novel terminal block for a meter socket. The terminal block is provided with cooperating attaching means for the reception of the plug-in terminal. Such cooperating attaching means are designed to co-act with the attaching means of the novel plug-in terminal to thereby automatically secure such terminal to the terminal block without the need of any tools, when the terminal is inserted into the terminal block.

Referring now specifically to FIGURES 1 and 2 of the drawing, the invention is shown in a preferred form as comprising a terminal block, shown as insulating base member 10, which may be secured to a meter socket (not shown) in any manner well known to those skilled in the art. Attached to one end of the terminal block 10 is a standard terminal jaw 12 with a wire connecting means such as wire connector strap 14 attached thereto. The terminal jaw 12 is one of the four terminal jaws utilized in a standard meter socket. As is well understood, the opposite end of the terminal block 10 will be provided with a similar terminal jaw (not shown). Of course, in the same meter socket a second terminal block similar to 10 is also provided. Further, another pair of terminal jaws will be provided for the other two terminals of the standard meter.

In the center of the terminal block 10 an opening 16 is provided for the reception of a plug-in terminal 18. As shown in FIGS. 1 and 2 the plug-in terminal 18 is comprised of a terminal jaw means 20 and a wire connecting means such as wire connector strap 22, which may be provided with a wire attaching terminal such as is shown at 14. As will be well understood by those skilled in the art, the terminal jaw 20 will receive the additional terminal of the meter (not shown) while the wire connecting means 22 will receive the additional desired wiring (not shown). The plug-in terminal 18 is secured to the terminal block 10 by attaching means on the terminal 18, which co-act with cooperating attaching means on the terminal block 10. These attaching means automatically co-act, when the terminal 18 is inserted into the terminal block 10, to firmly secure the plug-in terminal 18 thereto.

Referring specifically to FIG. 2 of the drawing, the cooperating attaching means of the terminal block 10 and the attaching means of the terminal 18 which automatically co-act when the terminal 18 is inserted into the terminal block 10 are more clearly seen. As shown in FIG. 2, the attaching means of terminal 18 is formed by a spring device 24 which is secured to the botom end of the terminal jaw 20 by a bolt 26 which is utilized to secure the wire connecting means 22 to the terminal jaw 20. As can be seen, the attaching means 24 is in the form of a U-shaped spring device being provided with side-turned ends such as outwardly extending ends 28 which cooperate with lips or shoulders 30 formed as part of opening 16 in the terminal block 10. Thus, as will be apparent from a perusal of FIG. 2, when the plug-in terminal 18 is inserted into the opening 16, the attaching means 24 will extend through the opening 16 until the outwardly extending ends 28 are snapped under the shoulders 30 formed on the terminal 10. In this manner, the terminal block 18 will be firmly attached to the terminal block 10 by the co-action between the attaching means 24 and the cooperating attaching means 30. Of course, it will be readily apparent that the firm securing of the terminal 18 to the terminal block 10 will be automatically performed merely by the insertion of terminal 18 into the opening 16 of terminal block 10.

Referring now to FIG. 3 of the drawing, it can be seen that a modification has been made of the attaching means on the plug-in terminal 18 and of the cooperating attaching means in the terminal block 10. As shown in FIG. 3 of the drawing, the U-shaped spring means 24a is similarly secured to the terminal jaw 20 by means of bolt 26. However, the spring attaching means 24a is provided with inturned ends 28a which cooperate with the internal shoulders 30a of the terminal block 10 to provide the desired automatic attachment of the terminal 18 to terminal block 10 upon the insertion of such terminal to the opening 16 of terminal block 10. From FIG. 3 it will be apparent that the co-action of the attaching means on terminal 18 with the cooperating attaching means on the terminal block 10 is automatically performed merely by the insertion of the terminal 18 into the opening 16 of terminal block 10.

FIG. 4 more clearly shows the terminal block 10 with its opening 16. As can be seen from FIG. 4, the opening 16 is formed between bosses 32 and 34 on the top portion 36 of the terminal block 10. In each of bosses 32 and 34 an extension 38 of opening 16 is provided for the reception of the legs of this spring means 24 or 24a. As will be apparent from FIG. 4, the lower end of the extensions 38 of the opening 16 are provided with the central shoulders 30a and the side shoulders 30, whereby either the plug-in terminal 18 of FIG. 2, or the modified form of FIG. 3, may be readily inserted into the opening 16 to automatically, firmly attach such plug-in terminal to the terminal block 10.

Referring now to FIGS. 5 and 6 of the drawings, a modified form of the plug-in terminal and terminal block cooperating attaching means is shown. As shown in FIGS. 5 and 6, a plug-in terminal 18a is provided which inserts into the opening 16a in a terminal block 10a. The plug-in terminal 18a is provided with a terminal jaw 20a and a wire connecting means 22a. The wire connecting means 22a is connected to the terminal jaw 20a by means of a bolt 26a. In this modification the bolt 26a is shown as being provided with a nut 42 to secure the bolt to the terminal jaw and the wire connecting means. The plug-in terminal 18a of this modification is provided with attaching means in the form of slots 44 which are formed on each side of the terminal jaw 20a. The terminal block 10a is provided with cooperating attaching means in the form of a U-shaped spring device 46 which is secured to the terminal block by means of a bolt 48 and which extends out through the opening 16, through the extension slots 38a which are formed in each of the bosses 32a and 34a. The ends of the U-shaped spring cooperating attaching means 46 are provided with side-turned ends such as turn-in ends 50, which ends co-act with the slots 44 in the sides of the terminal jaw 20a to firmly secure the terminal 18a to the terminal block 10a. As can be readily understood from FIGS. 5 and 6 in the drawings, when the terminal 18a is inserted into the opening 16a of the terminal block 10a, the cooperating attaching means 46 of the terminal block 10a will have its ends 50 expanded by contact with the bottom of the plug-in terminal 18a as the terminal 18a is forced into the opening 16a formed by the bosses 32a and 34a, the ends 50 of the cooperating attaching means 46 will co-act with the attaching means of the terminal block 18a, in the form of the openings 44, to thereby automatically, firmly secure the plug-in terminal 18a to the terminal block 10a.

From the above it can be seen that by means of the plug-in terminal and the terminal block of this invention that a novel plug-in terminal has been provided which will automatically be secured to the terminal block of a meter socket by the automatic co-action of the attaching means on the plug-in terminal and the cooperating attaching means on the terminal block. Thus, it can be seen that all of the objects and advantages hereinbefore specified have been clearly provided in the invention herein set forth.

While there has been shown and described the specific embodiments of a plug-in terminal and terminal block of the present preferred embodiments of this invention; in accordance with the patent statutes, it will be readily apparent to those skilled in the art that various changes may be made in the construction of such plug-in terminal and terminal block. It will also be apparent that such changes may be made without departing from the spirit and scope of this invention as is set forth in the appended claims.

What is claimed as new and which it is desired to secure by Letters Patent of the United States is:

1. A plug-in terminal for use with a meter socket, said plug-in terminal comprising a terminal jaw for receiving the terminal of a meter, a wire connecting means attached to said terminal jaw, attaching means secured to said terminal in the form of a U-shaped spring device, said U- shaped spring device having side-turned ends for automatically connecting to the terminal block of a meter socket when said terminal is inserted into the terminal block.

2. A meter socket terminal block having a plug-in additional terminal comprising, in combination, a terminal block of a meter socket, said terminal block having at least one terminal jaw for receiving the terminals of a meter and being provided with an opening to receive a plug-in terminal, a plug-in terminal, attaching means on said terminal, cooperating attaching means on said terminal block, one of said attaching means being in the form of a U-shaped spring device having side-turned ends, said attaching means co-acting with said cooperating attaching means to automatically secure said terminal to said terminal block when said terminal is inserted into said opening in said terminal block.

3. A meter socket terminal block having a plug-in additional terminal comprising, in combination, a terminal block of a meter socket, said terminal block having at least one terminal jaw for receiving the terminals of a meter and being provided with an opening to receive a plug-in terminal, a plug-in terminal, attaching means in the form of a U-shaped spring on said terminal, cooperating attaching means in the form of shoulders in said opening on said terminal block, said U-shaped spring having side-turned ends co-acting with said shoulders to automatically secure said terminal to said terminal block when said terminal is inserted into said opening in said terminal block.

4. A meter socket terminal block having a plug-in additional terminal comprising, in combination, a terminal block of a meter socket, said terminal block having at least one terminal jaw for receiving the terminals of a meter and being provided with an opening to receive a plug-in terminal, a plug-in terminal, attaching means in the form of slots on the sides of said plug-in terminal, cooperating attaching means on said terminal block in the form of a U-shaped spring having the ends thereof turned to the side and extending through said opening in said terminal block, said slots in said terminal co-acting with said side-turned ends of said U-shaped spring to automatically secure said terminal to said terminal block when said terminal is inserted into said opening in said terminal block.

5. A plug-in terminal for use with a meter socket, said terminal comprising a terminal jaw for receiving the terminals of a meter, a wire connecting means attached to said terminal jaw, a U-shaped spring means attached to said terminal jaw, said spring means having side-turned ends for automatically connecting to a terminal block of a meter socket when said terminal is inserted into the terminal block.

References Cited by the Examiner
UNITED STATES PATENTS

| 2,631,184 | 3/53 | Sampson | 339—150 |
|---|---|---|---|
| 2,880,380 | 3/59 | Schmidt et al. | 339—31 |
| 3,079,582 | 2/63 | Lazar | 339—217 |

FOREIGN PATENTS 1,211,628  10/59  France.

OTHER REFERENCES

G. E. "Electrical World," Sept. 19, 1960, page 119.

DONLEY J. STOCKING, *Primary Examiner.*

JOSEPH D. SEERS, ALFRED S. TRASK, *Examiners.*